(12) United States Patent
Legner

(10) Patent No.: US 7,198,143 B2
(45) Date of Patent: Apr. 3, 2007

(54) HYDRAULICALLY ACTUATED SYNCHRONIZED TRANSMISSION

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 10/519,445

(22) PCT Filed: Jun. 26, 2003

(86) PCT No.: PCT/EP03/06734

§ 371 (c)(1),
(2), (4) Date: Dec. 29, 2004

(87) PCT Pub. No.: WO2004/005737

PCT Pub. Date: Jan. 15, 2004

(65) Prior Publication Data

US 2006/0049018 A1    Mar. 9, 2006

(30) Foreign Application Priority Data

Jul. 2, 2002   (DE) ............................... 102 29 515

(51) Int. Cl.
*F16D 23/06* (2006.01)
(52) U.S. Cl. .................. 192/53.34; 192/69.9; 192/85 A
(58) Field of Classification Search ............... 192/53.34
See application file for complete search history.

(56) References Cited

U.S. PATENT DOCUMENTS

| 4,069,803 | A | * | 1/1978 | Cataldo ................... 123/198 F |
| 4,131,185 | A | | 12/1978 | Schall |
| 5,377,800 | A | * | 1/1995 | Sperduti et al. ........ 192/85 CA |
| 5,782,331 | A | | 7/1998 | Bailly et al. |
| 6,250,446 | B1 | | 6/2001 | Leite |

FOREIGN PATENT DOCUMENTS

| DE | 43 24 814 A1 | 1/1995 |
| DE | 43 25 964 A1 | 1/1995 |
| DE | 37 11 490 C2 | 4/1995 |
| FR | 2 388 173 | 11/1978 |
| GB | 879436 | 10/1961 |
| GB | 1 212 658 | 11/1970 |

* cited by examiner

*Primary Examiner*—Richard M. Lorence
(74) *Attorney, Agent, or Firm*—Davis Bujold & Daniels, P.L.L.C.

(57) ABSTRACT

A transmission shift system comprising a synchronizing device for idler wheels, which can be actuated hydraulically and comprises at least one piston that can mesh with a selected idler wheel as the sliding sleeve. The piston can be displaced axially on a shaft via a hydraulic actuation and is non-rotatably connected with it, thus self-locking synchronization is provided.

14 Claims, 4 Drawing Sheets

HYDRAULICALLY ACTUATED SYNCHRONIZED TRANSMISSION

This application is a national stage completion of PCT/EP2003/006734 filed Jun. 26, 2003 which claims priority from German Application Serial No. 102 29 515.8 filed Jul. 2. 2002.

FIELD OF THE INVENTION

The present invention relates to a transmission shift system for idler wheels.

BACKGROUND OF THE INVENTION

From the state of the art, transmission shift systems for idler wheels are known. In the familiar transmission shift systems generally synchronizing devices are provided for the purpose of synchronizing the idler wheels, wherein the devices actuate the sliding sleeves mechanically in order to synchronize the desired idler wheel with a shaft.

From the publication DE 43 24 814 A1, a transmission with a lock synchronization arrangement is known, wherein a synchronizer member that is connected to a transmission shaft and at least one gear wheel rotating at a different speed can be positively coupled during synchronous speed with the help of an annular sliding sleeve that is axially displaceable by the gearshift force. A synchronizer ring is provided, between the sliding sleeve and each gear wheel, wherein parts of the synchronizer ring form a positively engaged coupling with parts of the gear wheels. In the absence of synchronization, the axial movement of the sliding sleeve is blocked by blocking surfaces of locking teeth. In such a transmission, the synchronization is also shifted mechanically via the sliding sleeve.

The publication DE 37 11 490 C2 discloses a gear shifting device. In this gear shifting device, the sliding sleeve is actuated by an adjusting arrangement accommodated in the shaft and operated by means of hydraulic fluid, wherein the arrangement consists of a hydraulically actuatable piston arrangement. A connecting pin, which connects the sliding sleeve to the hydraulic piston arrangement, is provided, which extends through a hole with axial play that is arranged transversely in the shaft. The familiar gear shifting device disadvantageously requires a very complex layout since the actuating device or piston arrangement is accommodated in the shaft. This affects the manufacturing costs of the familiar gear shifting devices negatively.

It is the object of the present invention to suggest a transmission shift system of the aforementioned kind, which comprises a synchronizing device with a simple design and which additionally can be selected as easily as possible.

SUMMARY OF THE INVENTION

A transmission shift system, according to the invention, is suggested in which the piston, which is provided as the sliding sleeve, is actuated hydraulically, wherein a self-locking synchronizing device is provided. The piston is axially arranged, displaceable on a shaft by means of hydraulic actuation and is connected with the shaft in a non-rotatable fashion. Furthermore, the piston is provided on the circumference of the shaft, resulting in a synchronizing device with axial friction surfaces on the idler wheel with a very simple design. Beneficially, only a certain hydraulic pressure level is required for actuation. The pressure level can, therefore, be selected via simple switching valves.

Within the framework of a further beneficial development of the invention, it can be provided that the synchronizing device comprises at least one piston that can mesh with a selected idler wheel. The piston is, therefore, displaced axially on the shaft by means of hydraulic actuation. To return the piston to an idle position of the synchronizing device, at least one suitable return spring element or the like can be provided.

The piston can preferably be designed as an annular flange that is step-shaped in its cross-section, wherein it is seated in a piston carrier, which is firmly connected to the shaft. Between the piston and the piston carrier, a piston chamber is provided for hydraulic actuation, which is preferably supplied with pressure oil. The piston, which is designed as an annular flange, can be equipped on its outer step with first interior gear teeth as the coupling teeth to the idler wheel and with second interior gear teeth on the inner step to connect to the shaft.

Pursuant to a further development of the present invention, the idler wheel which is seated rotatably on the shaft and can comprise running gears, which are positively connected to additional torque-transmitting elements. Furthermore, coupling teeth can be provided for positive connection with the piston on the idler wheel in the shifted-through state.

The idler wheel can preferably be seated on a profile element or the like of the shaft. It is also conceivable for a rolling or plain bearing to be used to seat the idler wheel.

The piston carrier can alternatively also form a single component with the shaft. To seal the piston chamber at least one sealing element can be provided, which is preferably installed in a corresponding recess on the piston carrier. It is also possible to arrange one or more sealing elements, such as sealing rings or the like, on the piston.

A further development of the present invention can provide that in the axial direction between the piston and the idler wheel a first friction plate with inside and outside teeth is arranged. The outside teeth are preferably chamfered at least on the end facing the piston so that the first friction plate acts as a locking element during the synchronizing phase and represents a self-locking synchronizing device. Furthermore, a second friction plate can be arranged on the side of the idler wheel that faces away from the piston. It is especially beneficial if the first friction plate and the second friction plate are identical in design so that the production requirements are reduced.

Alternatively a third friction plate, which forms an outside plate, and a fourth friction plate, which forms an inside plate, can be arranged on the transmission shift system pursuant to the invention, wherein the inside plate can be arranged between the outside plate and the second friction plate.

BRIEF DESCRIPTION OF THE DRAWINGS

The invention will now be described, by way of example, with reference to the accompanying drawings in which.

DETAILED DESCRIPTION OF THE INVENTION

Figure 1:
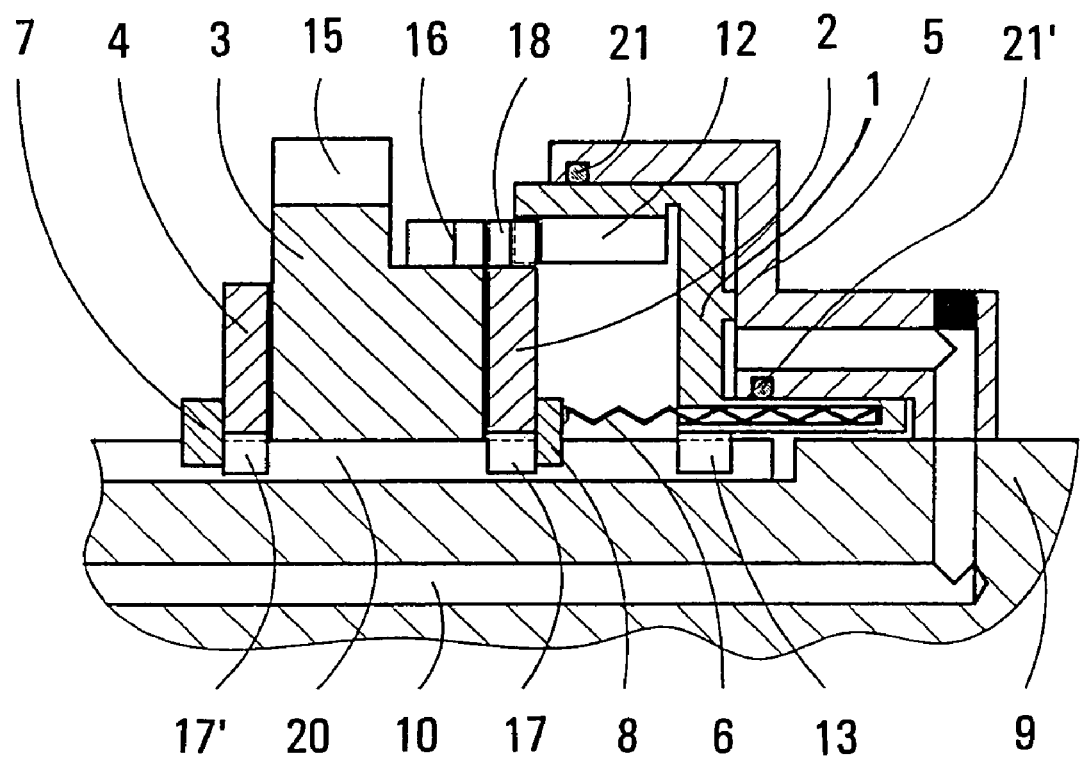
FIG. 1 is a cut sectional partial view of the transmission shift system pursuant to the invention with synchronization in idle.

In FIG. 1 through 6, a possible embodiment of the transmission shift system with a synchronizing device, according to the invention, is illustrated.

The synchronizing device comprises a piston 1, which is designed as a step-shaped annular flange and comprises first interior teeth 12 as the coupling teeth with an idler wheel 3 on its outside step and second interior teeth 13 on its inside step for the purpose of connecting with a shaft 9. The piston 1 is axially displaceable on the shaft and is connected to it non-rotatably, wherein the piston that is designed as an annular flange is provided on the circumference of the shaft. The end of the first interior teeth of the piston 12 or of the sliding sleeve facing the idler wheel 3 is chamfered at least in part.

In the axial direction, a first friction plate 2 with interior teeth 17 and exterior teeth 18 is arranged between the piston 1 and the idler wheel 3, wherein the side facing the idler wheel 3 serves as a friction surface. During a synchronizing phase, the first friction plate 2 is also used as a locking element resulting in a self-locking synchronizing device. The exterior teeth 18 of the friction plate 2 are chamfered on the end facing the piston 1. In the radial direction, the friction plate 2 can rotate in its interior teeth in relation to the shaft 9 around the intermediate space between two adjoining teeth of the first interior teeth 12 of the piston 1. For this purpose, the interior teeth of the friction plate 2 are arranged with play to the shaft 9, which is designed to be as large as the intermediate space between two adjoining teeth of the first interior teeth 12 of the piston 1.

The idler wheel 3 comprises running gears 15 and coupling teeth 16 with chamfered teeth on the side facing the friction plate 2. In a non-shifted state, i.e. in idle, the idler wheel 3 can rotate freely on the shaft 9. The idler wheel 3 is seated rotatably on a profile 20 of the shaft 9.

In the axial direction, a second friction plate 4 is provided behind the idler wheel 3, the plate 4 comprising only one set of interior teeth 17' toward the shaft 9. On the sides of the friction plates 2, 4 that face away from the idler wheel 3, safety rings 7, 8 are provided, which support the friction plates 2, 4 in an axial direction. The friction plates 2, 4 contain a suitable friction coating on the friction surfaces.

The piston 1 is seated in a piston carrier 5, which is firmly connected to the shaft 9. The piston carrier 5 comprises a pressure oil feed line 10 for hydraulically actuating the synchronizing device and suitable sealing elements 21, 21' for sealing the piston chamber 1. Furthermore, return springs 6 are evenly distributed across the circumference of the piston 1. The return springs 6 enable the piston 1 to return to its position in a non-shifted state.

FIG. 1 shows the transmission shift system in idle, according to the invention. In idle, the piston 1 is held against a stop on the piston carrier 5 by the return springs 6. The piston chamber between the piston 1 and the piston carrier 5 is without pressure in this state. The idler wheel 3 can rotate freely on the shaft 9, wherein axial play exists, between the idler wheel 3 and the respective friction plates 2, 4. With respect to the circumferential direction, the first friction plate 2 assumes any random position in its rotational play in relation to the shaft 9.

Figure 2:
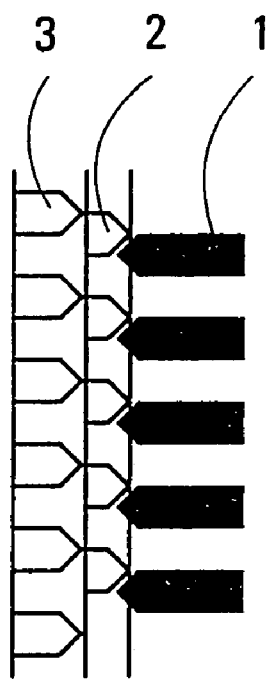
FIG. 2 is a diagrammatic view of the positions of the various gear wheels in relation to one another pursuant to FIG. 1.

FIG. 2 illustrates that in idle, the chamfered teeth of the first interior teeth 12 of the piston 1 do not come into contact with the chamfered teeth of the exterior teeth 18 of the friction plate 2.

Figure 3:
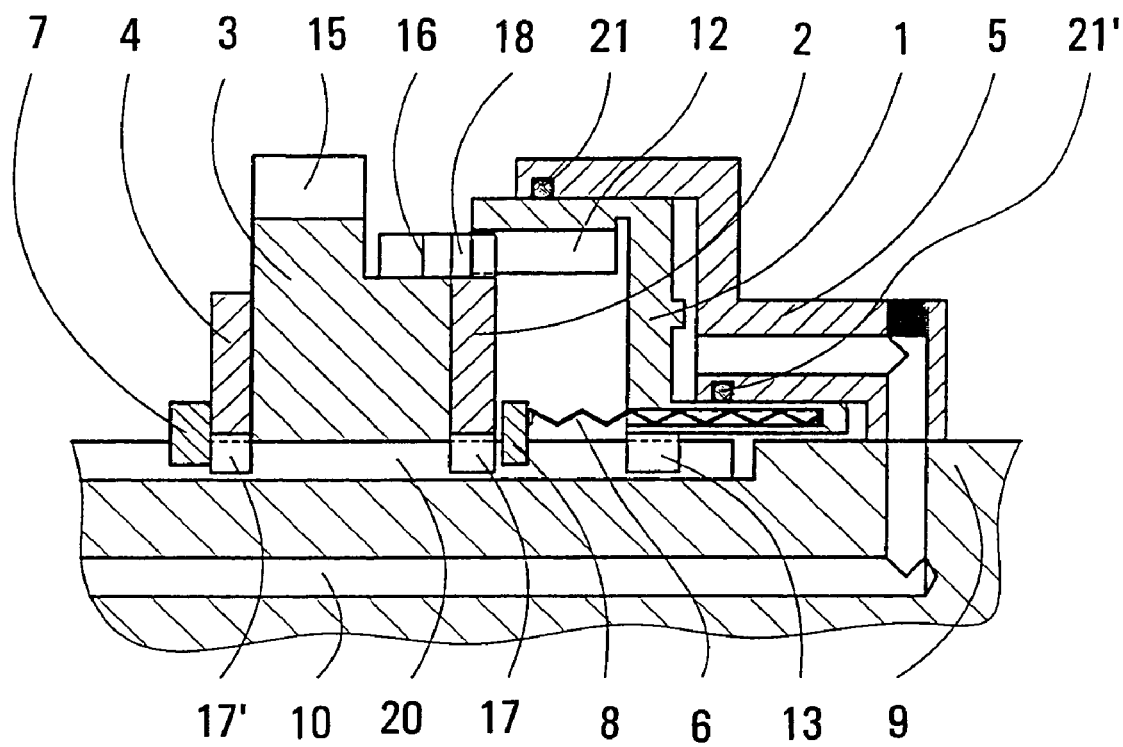
FIG. 3 is a cut sectional partial view of the transmission shift system pursuant to the invention with synchronization in the locking or synchronization position.
Figure 4:
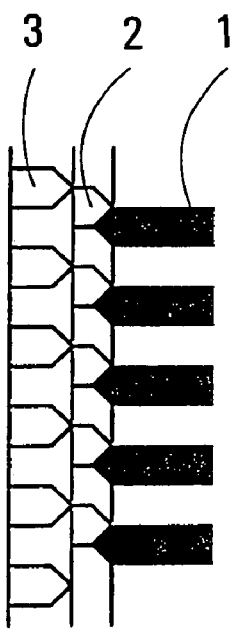
FIG. 4 is a diagrammatic view of the positions of the various gear wheels in relation to one another pursuant to FIG. 2.

FIG. 3 shows a locking and synchronizing position of the transmission shift system. The piston chamber between the piston 1 and the piston carrier 5 is fed with pressure oil in this position. Moving the piston 1 eliminates the axial play between the idler wheel 3 and the respective friction plates 2, 4, and the friction plates 2, 4 are pushed against the safety rings 7, 8. Due to the friction torque acting in the circumferential direction between the idler wheel 3 and the friction plate 2, said plate is rotated against the piston 1 to its maximum rotational play. The chamfered teeth of the piston 1 rest against the chamfered teeth of the first friction plate 2, as illustrated in FIG. 4. In this locking and synchronizing position of the transmission shift system, shifting of the piston 1 is prevented.

The circumferential force present on the friction plate 2 due to the friction torque is greater than the circumferential force acting on the friction plate 2 from the chamfered tooth surfaces of the piston 1. This means that the piston 1 remains locked as long as a speed differential, and hence a corresponding friction torque, exists between the shaft 9 and the idler wheel 3.

Figure 5:
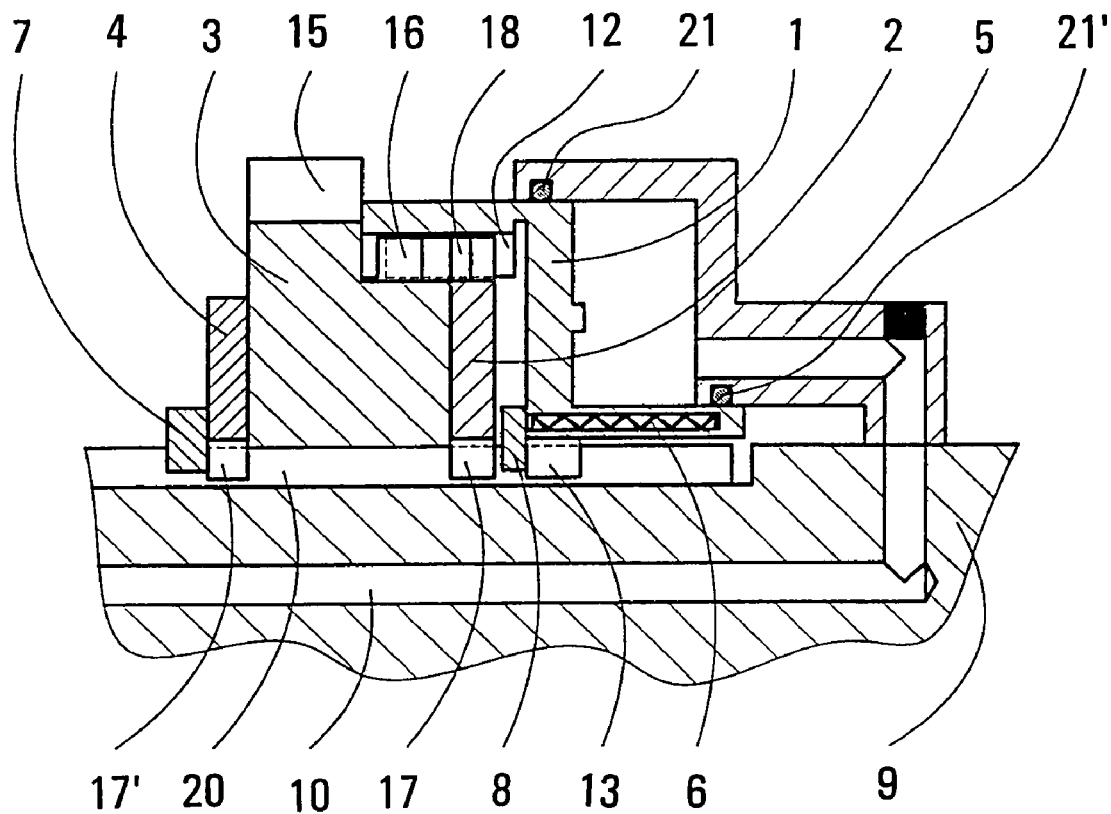
FIG. 5 is a cut sectional partial view of the transmission shift system pursuant to the invention with synchronization in the shifted state.
Figure 6:
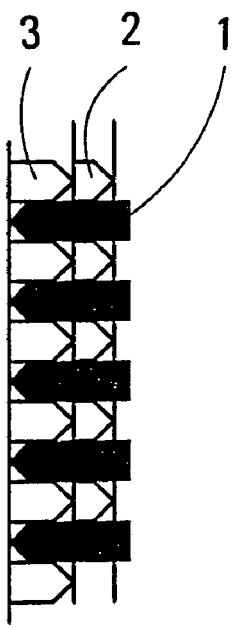
FIG. 6 is a diagrammatic view of the positions of the various gear wheels in relation to one another pursuant to FIG. 5.

FIG. 5 shows the shifted state in which the idler wheel 3 is connected positively to the shaft 9 via the piston 1. As soon as the speed differential between the idler wheel 3 and the friction plate 2 moves toward zero, the circumferential force present on the first friction plate 2 that is from this friction torque disappears. The piston 1 is then able to rotate the friction plate 2 back so that the teeth of the first interior teeth 12 of the piston 1 can be guided through the intermediate spaces between the teeth of the exterior teeth 18 of the first friction plate 2, as is indicated in FIG. 6. The piston 1 can hence be shifted so that the piston 1 with the idler wheel 3 is positively connected with the shaft 9.

To release the connection it is only necessary to eliminate the applied pressure of the piston chamber between the piston 1 and the piston carrier 5. The return springs 6 then slide the piston 1 back into its starting position.

Figure 7:
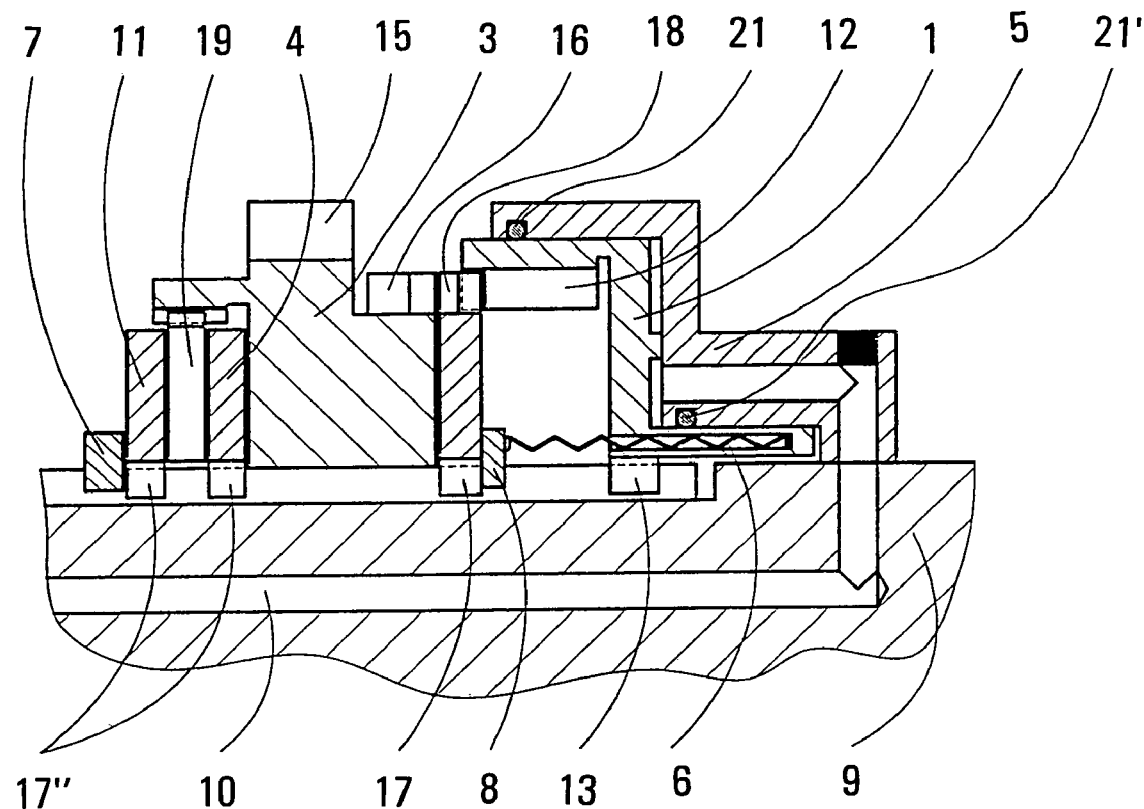
FIG. 7 is a cut sectional partial view of another embodiment of the transmission shift system pursuant to the invention with synchronization.
Figure 8:
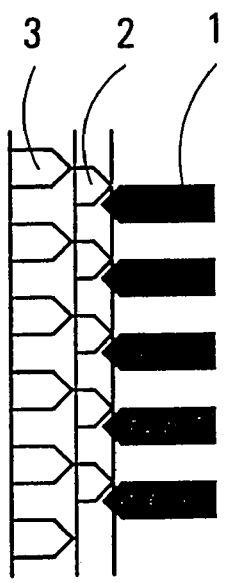
FIG. 8 is a diagrammatic view of the positions of the various gear wheels in relation to one another pursuant to FIG. 7.

Should greater friction torque be required on the synchronizing device, another embodiment of the transmission shift system as illustrated in FIGS. 7 and 8 can be used.

The embodiment shown there represents a possible expansion of the previously illustrated embodiment. In this synchronizing device a third friction plate 11 is provided as an exterior plate and a fourth friction plate 19 is provided as an interior plate on the side of the idler wheel 3 that faces away from the piston 1. The third friction plate 11 also contains interior teeth 17" for the purpose of connection with the shaft 9.

This way the number of friction surfaces can be increased to 4 in the embodiment illustrated here. The number of friction surfaces can be further increased beyond the number shown here.

| Reference numerals | |
|---|---|
| 1 | piston |
| 2 | friction plate with interior and exterior teeth |
| 3 | idler wheel |
| 4 | friction plate with interior teeth |
| 5 | piston carrier |
| 6 | return springs |
| 7 | safety ring |
| 8 | safety ring |
| 9 | shaft |
| 10 | pressure oil supply line |
| 11 | third friction plate |
| 12 | first interior teeth of the piston |
| 13 | second interior teeth of the piston |
| 15 | running gears |
| 16 | coupling teeth of the idler wheel |
| 17, 17', 17" | interior teeth on the friction plates |
| 18 | exterior teeth of the first friction plate |
| 19 | fourth friction plate |
| 20 | profile |
| 21, 21' | sealing rings/elements |

The invention claimed is:

1. A transmission shift system comprising a synchronizing device, for an idler wheel, which can be actuated hydraulically and comprises at least one sliding sleeve piston (1) that can mesh with a selected idler wheel (3), the piston (1) is non-rotatably connected with a shaft (9) and can be displaced axially on the shaft (9) by hydraulic actuation, a self-locking synchronization is provided by at least a first friction plate (2, 4) comprising a friction surface facing the idler wheel (3); and at least the first friction plate (2, 4) comprises at least one set of interior teeth (17, 17') which is provided for connection with the shaft (9).

2. The transmission shift system according to claim 1, wherein the synchronizing device comprises a piston carrier (5) accommodating the piston (1), said piston carrier is non-rotatably connected to the shaft (9) and comprising a pressure oil feed line (10) so that a piston chamber, between the piston (1) and the piston carrier (5), is provided which can be supplied with pressure for hydraulically actuating the piston (1).

3. The transmission shift system according to claim 1, wherein the piston (1) is a step-shaped annular flange which, on an outside step, comprises first set of interior teeth (12) for connecting with the idler wheel (3) and, on an inside step, comprises second set of interior teeth (13) for connecting with the shaft (9).

4. The transmission shift system according to claim 3, wherein at least ends of the first set of interior teeth (12) of the piston (1) facing the idler wheel (3) are chamfered.

5. The transmission shift system according to claim 1, wherein the idler wheel (3) comprises a running gear (15) for positive connection with an additional torque-transmitting element and a set of coupling teeth (16) for positive connection with the piston (1) and the idler wheel (3) is rotatably seated on the shaft (9).

6. The transmission shift system according to claim 1, wherein in an axial direction between the piston (1) and the idler wheel (3), the first friction plate (2) with the set of interior teeth (17) and a set of exterior teeth (18) is provided, and the set of exterior teeth (18) is chamfered at least on an end facing the piston (1).

7. The transmission shift system according to claim 1, wherein the first friction plate (2), during a synchronizing phase, is provided as a locking element resulting in a self-locking synchronizing device.

8. The transmission shift system according to claim 1, wherein teeth of a first set of interior teeth (12) of the piston (1) can be guided through respective intermediate spaces between teeth of a first set of exterior teeth (18) of the first friction plate (2) for shifting purposes so that the piston (1), connected to the shaft (9), can be positively connected to the idler wheel (3).

9. The transmission shift system according to claim 1, wherein a second friction plate (4) is arranged on a side of the idler wheel (3) facing away from the piston (1).

10. The transmission shift system according to claim 9, wherein a third friction plate (11) and a fourth friction plate (19) are provided, and the fourth friction plate (19) is arranged between the second friction plate (4) and the third friction plate (11).

11. The transmission shift system according to claim 1, wherein at least one return spring (6) is provided for returning the piston (1) to an unshifted position.

12. The transmission shift system according to claim 11, wherein a plurality of return springs (6) are provided, and the plurality of return springs (6) are evenly distributed about a circumference of the piston (1).

13. The transmission shift system according to claim 1, wherein at least one sealing element (21, 21') is provided between a piston carrier (5) and the piston (1) to seal a piston chamber.

14. The transmission shift system according to claim 7, wherein interior teeth of the first friction plate (2) have play, in relation to the shaft (9), that is as large as an intermediate space between two adjoining teeth of a first set of interior teeth (12) of the piston.

* * * * *